(12) United States Patent
Galindo et al.

(10) Patent No.: US 11,236,686 B2
(45) Date of Patent: *Feb. 1, 2022

(54) BI-FUEL ENGINE WITH INCREASED POWER

(71) Applicant: H2 IP Investments Ltd., Tortola (VG)

(72) Inventors: Jose Ignacio Galindo, Reñaca (CL); Klaus M. Schaffer, Kirchfidisch (AT); Daniel Leitner, St. Stefan (AT); Christof Hepp, Dorbin (AT)

(73) Assignee: H2 IP INVESTMENTS LTD., Road Town (VG)

(*) Notice: Subject to any disclaimer, the term of this patent is extended or adjusted under 35 U.S.C. 154(b) by 0 days.

This patent is subject to a terminal disclaimer.

(21) Appl. No.: 16/947,206

(22) Filed: Jul. 23, 2020

(65) Prior Publication Data

US 2020/0355127 A1 Nov. 12, 2020

Related U.S. Application Data

(63) Continuation of application No. 14/556,776, filed on Dec. 1, 2014, now Pat. No. 10,738,718, which is a continuation of application No. 12/795,440, filed on Jun. 7, 2010, now Pat. No. 8,931,463.

(51) Int. Cl.
| | |
|---|---|
| *F02D 19/06* | (2006.01) |
| *F02D 41/00* | (2006.01) |
| *F02B 37/16* | (2006.01) |
| *F02B 37/18* | (2006.01) |
| *F02B 37/22* | (2006.01) |

(Continued)

(52) U.S. Cl.
CPC .......... *F02D 19/0644* (2013.01); *F02B 37/16* (2013.01); *F02B 37/18* (2013.01); *F02B 37/22* (2013.01); *F02B 37/24* (2013.01); *F02D 19/066* (2013.01); *F02D 19/0613* (2013.01); *F02D 41/0007* (2013.01); *F02D 41/0025* (2013.01); *F02D 41/0027* (2013.01); *F02B 29/0406* (2013.01); *Y02T 10/12* (2013.01); *Y02T 10/30* (2013.01)

(58) Field of Classification Search
CPC ............ F02D 19/0644; F02D 19/0684; F02D 19/066; F02D 19/0613; F02D 19/0663; F02D 41/0025; F02D 41/0007; F02D 41/0027; F02B 37/06; F02B 37/18; F02B 37/22; F02B 37/24; F02B 29/0406; Y02T 10/12; Y02T 10/30

See application file for complete search history.

(56) References Cited

U.S. PATENT DOCUMENTS

| | | | |
|---|---|---|---|
| 7,019,626 B1 * | 3/2006 | Funk | F02D 19/081 340/438 |
| 7,302,933 B2 * | 12/2007 | Kerns | F02D 41/0045 123/431 |

(Continued)

*Primary Examiner* — Grant Moubry

(57) ABSTRACT

A conventional gasoline engine is retrofitted and calibrated to operate as a bi-fuel engine using Hydrogen as the second fuel. When operated with Hydrogen, which typically leads to a reduction of engine output power, the engine is preferably operated in a charged mode and in a lean mode with the engine throttle kept in a wide open position during charged and lean mode operation resulting in a more efficient engine with a reduction of engine output power loss.

22 Claims, 2 Drawing Sheets

(51) Int. Cl.
    *F02B 37/24*     (2006.01)
    *F02B 29/04*     (2006.01)

(56) References Cited

U.S. PATENT DOCUMENTS

| | | | |
|---|---|---|---|
| 8,448,616 B2 * | 5/2013 | Kirk | F01L 13/0005 123/90.15 |
| 8,931,463 B2 * | 1/2015 | Galindo | F02B 37/16 123/575 |
| 2004/0149255 A1 * | 8/2004 | zur Loye | F02M 69/046 123/295 |
| 2007/0051350 A1 * | 3/2007 | Pallet | F02D 17/02 123/688 |
| 2009/0071453 A1 * | 3/2009 | Stockhausen | F02D 19/061 123/577 |
| 2011/0301826 A1 * | 12/2011 | Galindo | F02D 19/066 701/103 |

* cited by examiner

BI-FUEL ENGINE WITH INCREASED POWER

This application is a continuation of application Ser. No. 14/556,776 now U.S. Pat. No. 10,738,718 entitled "Bi-Fuel Engine With Increased Power," filed on Dec. 1, 2014, which is a continuation of application Ser. No. 12/795,440, now U.S. Pat. No. 8,931,463, entitled "Bi-Fuel Engine With Increased Power" filed on Jun. 7, 2010 concurrently with commonly owned and related application Ser. No. 12/795,410 entitled "Bi-Fuel Engine With Variable Air Fuel Ratio."

BACKGROUND OF THE INVENTION

Field of the Invention

The present invention generally relates to the design and control of internal combustion engines that can operate on two different fuels and the relative power of the engines at the different fuels.

Description of the Related Art

Internal combustion engines operate on the principle of igniting a mixture of air and gasoline (or other fuel) inside a cylinder to cause combustion within the cylinder where resulting released energy is converted to mechanical energy through the use of a piston inside the cylinder driving a crankshaft. A fuel intake assembly, such as gasoline fuel injectors, is used to inject gasoline into cylinders or intake system of the engine. Internal combustion engines are typically naturally aspirated meaning that air is drawn from the environment at atmospheric pressure. As a result of the combustion of the air fuel mixture within a cylinder of the engine, different types of unwanted toxic and pollutant gases are created in the cylinder and pass through an exhaust system to a device commonly referred to as a catalytic converter.

Typically, internal combustion engines (especially those used for automobiles) use gasoline (or diesel) as a fuel which when burned in an internal combustion engine generates exhaust gases some of which are pollutants and/or toxic. Other less polluting carbon based fuels or even non-carbon based fuels can be used, but many of these fuels when mixed with air don't have as nearly the same energy content (i.e., 'mixture calorific value') for nearly the power output as when burning gasoline (i.e., gasoline mixed with air). It is desirable, however, to use some of these fuels because they can be used in what is referred to as a "lean mode" operation where virtually no toxic or polluting gases are generated from the combustion process. Operation in the lean mode refers to the air/fuel ratio with which the engine is being operated. In particular, the ratio of the amount of air and fuel in a combustion chamber of the engine will determine whether the engine is being operated in the lean mode or rich mode. For an ideal combustion the amount of air and fuel used for combustion in a chamber of an engine is such that there is no residual oxygen or fuel remaining in the chamber after combustion, the particular air fuel ratio is referred to as the stoichiometric air fuel ratio. The actual air fuel ratio, however, may not be at stoichiometric at all times. A ratio of the actual air fuel ratio to the stoichiometric air fuel ratio is referred to as $\lambda$. The variable $\lambda$ is thus defined mathematically as:

$$\lambda = \frac{\left(\frac{\text{mass of air}}{\text{mass of fuel}}\right)_{actual}}{\left(\frac{\text{mass of air}}{\text{mass of fuel}}\right)_{stoichiometric}} \quad (1)$$

When $\lambda=1$ the engine is operated at the stoichiometric air fuel ratio because the actual air fuel ratio is equal to the stoichiometric air fuel ratio as can be seen from equation (1) above. For value of $\lambda<1$, the engine is said to be in the rich mode. For $\lambda>1$, the engine is said to be in the lean mode. As can be seen from equation (1) above, in the lean mode more air is used in the combustion than in the stoichiometric mode. As a result operation in the lean mode although more desirable because such a mode generates a lesser amount of harmful and/or pollutant gases, the loss of engine output power is exacerbated. Lean mode operation also results in a relatively high efficient operation of the engine because of the relatively low fuel consumption. This relatively high efficiency is often not realized because conventional gasoline engines typically do not run in lean mode.

Efficiency refers to fuel consumption for a defined engine output power. The more efficiently an engine is operating, the lower the fuel consumption for a specific engine output power. Increasing the efficiency of an engine results in lowering the fuel consumption of the engine. In other words, an engine can generate a specific output power by consuming a certain amount of fuel, but the same engine when run efficiently can generate the same amount of output power while consuming less fuel. One way to increase the efficiency of an internal combustion engine is to run the engine in lean mode.

BRIEF SUMMARY OF THE INVENTION

The method, device and system of the present invention provide an engine designed to operate with a first fuel with which it generates a certain engine output power and the engine is also designed to operate with a second fuel with which it generates a lesser engine output power. The engine is calibrated and retrofitted with a processor controlled air pump to significantly reduce the loss of engine output power when the second fuel is being used. When using the air pump during operation, the engine is said to be charged. The engine is also retrofitted with a fuel intake system for the second fuel and when using the second fuel, the engine is operated in a lean mode to improve efficiency while using quality control. Calibration of the engine to run on Hydrogen (or any other type of fuel) involves determining, calculating and setting the engine parameters to certain values to enable such operation. Retrofitting an engine refers to the modification and/or adjustment of a naturally aspirated engine, a turbocharged engine or a supercharged engine with the various components of the device of the present invention to operate in accordance with the method of the present invention.

The present invention comprises an air pump that can be coupled to the engine, a fuel intake system or assembly for the second fuel that can be mounted onto or within the engine and a processor that controls the fuel intake and air pump to selectively operate the engine using the second fuel. The fuel intake assembly may comprise a fuel delivery system (e.g., fuel injectors for the first and second fuels) for both the first and second fuels. The same processor can be used to operate the engine with the first fuel. When using the second fuel, the processor of the present invention controls the air pump to operate the engine in a charged mode to increase engine output power and the processor operates the engine preferably in a lean mode to increase efficiency of the engine while using quality control. As a result, a naturally aspirated engine will have a significantly reduced loss of output power when operated with the second fuel in a noncharged mode and said engine will operate more efficiently using lean mode operation and quality control. Charging of the second gaseous fuel generates approximately the same power output as the naturally aspirated first fuel. The charged mode refers to operation of the engine with the air pump which can be a turbocharger operated with and/or powered by exhaust gases of the engine. The pump can also be a supercharger (or any other pump) operated by electrical or electronic control signals from the processor. As a result, the engine can generate the same output power with the second fuel as with the first fuel when operated in the charged mode.

In a first embodiment of the present invention, the device, system and method of the present invention retrofit and calibrate a naturally aspirated engine operated with the first fuel (e.g., a gasoline engine) and also operated with a turbocharger when the second fuel is used. The turbocharger is selected for proper operation with the second fuel to allow the engine to operate in a charged mode (turbocharger activated) and preferably in a lean mode using a second fuel such as Hydrogen gas or any other fuel. The operation of the engine with the second fuel in naturally aspirated operation results in a loss of output power of the engine. However, the operation of the engine in the charged mode with the second fuel (e.g., a gaseous fuel), whereby exhaust gases resulting from the combustion of the second fuel are used to drive the turbo charger, significantly reduces the loss of output power of the engine. The output power of the engine is thus controlled by the amount of the second fuel being injected into the engine by using quality control. Quality control is a technique whereby the throttle of the engine is maintained in a wide open position, i.e., a position whereby the flow of air being pumped into the engine is not restricted by the throttle position. A wide open position will vary for different types of engines depending on throttle design and engine speed. 'Wide open' thus refers to the opening of the throttle to a position so as not to restrict the air flow into the engine (the air being pumped into the engine by the turbocharger or supercharger or air pump). As a result, the loss of output power of the engine using the second fuel is significantly reduced but the engine operates more efficiently. For this embodiment, the turbocharger can be a Variable Turbine Geometry (VTG) turbocharger.

In a second embodiment of the present invention, the device, system and method of the present invention retrofit and calibrate a turbocharged engine or a supercharged engine (i.e., engines originally designed with a turbocharger or a supercharger) to allow the engine to operate with the second fuel preferably in a lean mode.

For the second embodiment, in the case of a turbocharged engine, a second turbocharger selected for proper operation with the second fuel is added. Such a turbocharger is activated during operation with the second fuel (e.g., Hydrogen) while the originally designed turbo charger is deactivated or bypassed during such operation. Also, a processor controlled supercharger may be used to operate the engine in a charged mode when using the second fuel.

For the second embodiment, in the case of a supercharged engine, the supercharger can be operated (i.e., controlled electrically or electronically) at an appropriate power capacity to pump the proper amount of air into the engine when the second fuel (e.g., Hydrogen) is used by the engine. Also, a turbocharger can be added to the engine to operate the engine in a charged mode using the exhaust gases resulting from the combustion of the second fuel. As a result, for the case of an added second turbocharger or the use of a supercharger, the loss of power due to the use of the second fuel is significantly reduced. As with the first embodiment, quality control during lean mode operation are used when the second fuel is being used. That is, the throttle of the engine is kept in a wide open position (i.e., no restriction of air flow into the throttle) when using the second fuel in lean mode to improve engine efficiency. The output power of the engine is then controlled by the amount of the second fuel being injected into the engine.

In a third embodiment of the present invention, the device, system and method retrofit and calibrate a turbocharged engine wherein the originally designed turbocharger is removed and is replaced with a new turbocharger designed to operate with the exhaust gases of either the first or the second fuel. The exhaust gases resulting from the combustion of the first fuel have a certain first enthalpy or enthalpy range. The exhaust gases resulting from the combustion of the second fuel have a certain second enthalpy or enthalpy range. For this embodiment and the other embodiments, combustion of the fuel is understood to mean the combustion of a fuel with the proper amount of air. This new turbocharger is designed so that it can operate (i.e., properly driven) with the exhaust gases resulting from the combustion of the first fuel or the combustion of the second fuel. One particular example of such a turbocharger is a VTG turbocharger designed to operate for a relatively wide temperature range of exhaust gases; this type of VTG turbocharger will hereinafter be referred to as a Super VTG turbocharger. Such a Super VTG turbocharger, for example, can be operated with the exhaust gases resulting from the combustion of gasoline or the combustion of Hydrogen. This Super VTG turbocharger can, in many cases, be used to operate with either the first or the second fuel. As with the other embodiments, this Super VTG turbocharger significantly reduces the loss of output engine power when the engine is operated with the second fuel preferably in a lean mode and using quality control. In this embodiment, for a supercharged engine, a similar turbocharger can be used or the supercharger can be controlled by the processor to properly operate the engine for the different types of fuels.

In the case where the first fuel is gasoline and the second fuel is Hydrogen, the engine can be selectively operated by a user as either a gasoline engine or a Hydrogen gas engine. The terms Hydrogen and Hydrogen gas will hereinafter be used interchangeably to indicate the various states of Hydrogen which can be used in this claimed invention. In this case, the device, system and method of the present invention comprise a processor, an air pump coupled to the engine and implemented as a turbocharger (or supercharger) selected for proper operation with the second fuel, and a fuel intake assembly implemented with hydrogen fuel injectors and gasoline fuel injectors mounted onto the engine where both the Hydrogen fuel injectors and the turbocharger (or supercharger) are controlled by the processor to operate the engine using Hydrogen gas. When using Hydrogen gas, which generates less power than gasoline, the engine is preferably operated in a charged mode (turbocharged or supercharged) and in a lean mode using quality control. Consequently, the loss of engine output power resulting from operation with fuels, such as Hydrogen or other gaseous fuels compared to liquid fuels, such as gasoline, can

DETAILED DESCRIPTION

Figure 1:
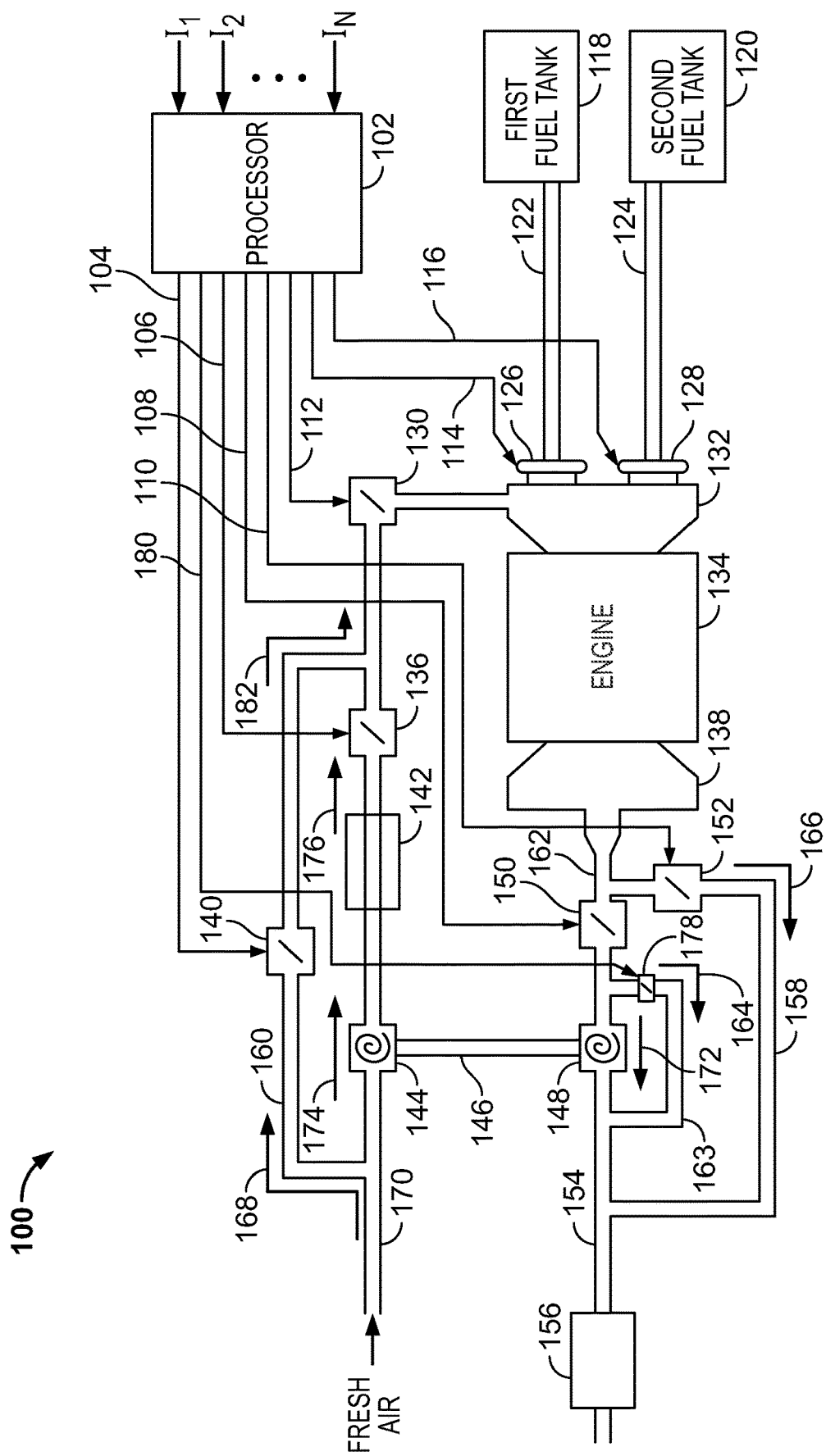
FIG. 1 shows one embodiment of the device and system of the present invention.

The method, device and system of the present invention provide an engine designed to operate with a first fuel with which it generates a certain engine output power and the engine is also designed to operate with a second fuel with which it generates a lesser engine output power. The engine is calibrated and retrofitted with a processor controlled air pump to significantly reduce the loss of engine output power when the second fuel is being used. When using the air pump during operation, the engine is said to be charged. The engine is also retrofitted with a fuel intake system for the second fuel and when using the second fuel, the engine is operated in a lean mode to improve efficiency while using quality control. Calibration of the engine to run on Hydrogen (or any other type of fuel) involves determining, calculating and setting the engine parameters to certain values to enable such operation. Retrofitting an engine refers to the modification and/or adjustment of a naturally aspirated engine, a turbocharged engine or a supercharged engine with the various components of the device of the present invention to operate in accordance with the method of the present invention.

The present invention comprises an air pump that can be coupled to the engine, a fuel intake system or assembly for the second fuel that can be mounted onto or within the engine and a processor that controls the fuel intake and air pump to selectively operate the engine using the second fuel. The fuel intake assembly may comprise a fuel delivery system (e.g., fuel injectors for the first and second fuels) for both the first and second fuels. The same processor can be used to operate the engine with the first fuel. When using the second fuel, the processor of the present invention controls the air pump to operate the engine in a charged mode to increase engine output power and the processor operates the engine preferably in a lean mode to increase efficiency of the engine while using quality control. As a result, a naturally aspirated engine will have a significantly reduced loss of output power when operated with the second fuel in the charged mode and said engine will operate more efficiently using lean mode operation and quality control. The charged mode refers to operation of the engine with the air pump which can be a turbocharger operated with and/or powered by exhaust gases of the engine. The pump can also be a supercharger (or any other pump) operated by electrical or electronic control signals from the processor. As a result, the engine can generate the same output power with the second fuel as with the first fuel when operated in the charged mode.

In a first embodiment of the present invention, the device, system and method of the present invention retrofit and calibrate a naturally aspirated engine operated with the first fuel (e.g., a gasoline engine) and also operated with a turbocharger when the second fuel is used. The turbocharger is selected for proper operation with the second fuel to allow the engine to operate in a charged mode (turbocharger activated) and preferably in a lean mode using a second fuel such as Hydrogen gas or any other fuel whose exhaust gases have less enthalpy than the enthalpy of the exhaust gases of the first fuel. The operation of the engine with the second fuel in naturally aspirated operation results in a loss of output power of the engine. However, the operation of the engine in the charged mode with the second fuel (e.g., a gaseous fuel), whereby exhaust gases resulting from the combustion of the second fuel are used to drive the turbo charger, significantly reduces the loss of output power of the engine. The output power of the engine is thus controlled by the amount of the second fuel being injected into the engine while in the charged mode using quality control. Quality control is a technique whereby the throttle of the engine is maintained in a wide open position, i.e., a position whereby the flow of air being pumped into the engine is not restricted by the throttle position. A wide open position will vary for different types of engines depending on throttle design and engine speed. 'Wide open' thus refers to the opening of the throttle to a position so as not to restrict the air flow into the engine (the air being pumped into the engine by the turbocharger or supercharger or air pump). As a result, the loss of output power of the engine using the second fuel is significantly reduced and the engine operates more efficiently. For this embodiment, the turbocharger can be a Variable Turbine Geometry (VTG) turbocharger.

In a second embodiment of the present invention, the device, system and method of the present invention retrofit and calibrate a turbocharged engine or a supercharged engine (i.e., engines originally designed with a turbocharger or a supercharger) to allow the engine to operate with the second fuel preferably in a lean mode.

For the second embodiment, in the case of a turbocharged engine, a second turbocharger selected for proper operation with the second fuel is added. Such a turbocharger is activated during operation with the second fuel (e.g., Hydrogen) while the originally designed turbo charger is deactivated or bypassed during such operation. Also, a processor controlled supercharger may be used to operate the engine in a charged mode when using the second fuel.

For the second embodiment, in the case of a supercharged engine, the supercharger can be operated (i.e., controlled electrically or electronically) at an appropriate power capacity to pump the proper amount of air into the engine when the second fuel (e.g., Hydrogen) is used by the engine. Also, a turbocharger can be added to the engine to operate the engine in a charged mode using the exhaust gases resulting from the combustion of the second fuel. As a result, for the case of an added second turbocharger or the use of a supercharger, the loss of power due to the use of the second fuel is significantly reduced. As with the first embodiment, quality control during lean mode operation are used when the second fuel is being used. That is, the throttle of the engine is kept in a wide open position (i.e., no restriction of air flow into the throttle) when using the second fuel in lean mode to improve engine efficiency. The output power of the engine is then controlled by the amount of the second fuel being injected into the engine.

In a third embodiment of the present invention, the device, system and method retrofit and calibrate a turbocharged engine wherein the originally designed turbocharger is removed and is replaced with a new turbocharger designed to operate with the exhaust gases of either the first or the second fuel. The exhaust gases resulting from the combustion of the first fuel have a certain first enthalpy or enthalpy range. The exhaust gases resulting from the combustion of the second fuel have a certain second enthalpy or enthalpy range. For this embodiment and the other embodiments, combustion of the fuel is understood to mean the combustion of a fuel with the proper amount of air. This new turbocharger is designed so that it can operate (i.e., properly driven) with the exhaust gases resulting from the combustion of the first fuel or the combustion of the second fuel. One particular example of such a turbocharger is a VTG turbocharger designed to operate for a relatively wide temperature range of exhaust gases; this type of VTG turbocharger will hereinafter be referred to as a Super VTG turbocharger. Such a Super VTG turbocharger, for example, can be operated with the exhaust gases resulting from the combustion of gasoline or the combustion of Hydrogen. This Super VTG turbocharger can, in many cases, be used to operate with either the first or the second fuel. As with the other embodiments, this Super VTG turbocharger significantly reduces the loss of output engine power when the engine is operated with the second fuel preferably in a lean mode and using quality control. In this embodiment, for a supercharged engine, a similar turbocharger can be used or the supercharger can be controlled by the processor to properly operate the engine for the different types of fuels.

In the case where the first fuel is gasoline and the second fuel is Hydrogen, the engine can be selectively operated by a user as either a gasoline engine or a Hydrogen gas engine. The terms Hydrogen and Hydrogen gas will hereinafter be used interchangeably to indicate the various states of Hydrogen which can be used in this claimed invention. In this case, the device, system and method of the present invention comprise a processor, an air pump coupled to the engine and implemented as a turbocharger (or supercharger) selected for proper operation with the second fuel, and a fuel intake assembly implemented with hydrogen fuel injectors and gasoline fuel injectors mounted onto the engine where both the Hydrogen fuel injectors and the turbocharger (or supercharger) are controlled by the processor to operate the engine using Hydrogen gas. When using Hydrogen gas, which generates less power than gasoline, the engine is preferably operated in a charged mode (turbocharged or supercharged) and in a lean mode using quality control. Consequently, the loss of engine output power resulting from operation with fuels, such as Hydrogen or other gaseous fuels compared to liquid fuels, such as gasoline, can be significantly reduced by using the method, device and system of the present invention.

It should be noted that in cases where the mixture of air and the second fuel has less mixture calorific value (i.e., less energy content) than the mixture of air and the first fuel, the enthalpy of the exhaust gases of the second fuel is less than the enthalpy of the exhaust gases of the first fuel. The exhaust gases from the first fuel result from the combustion of said first fuel within the engine. Similarly, the exhaust gases from the second fuel are a result of the combustion of the second fuel within the engine.

It should also be noted that the device, system and method of the present invention apply to engines referred to as Otto cycle engines which include gasoline internal combustion engines as well as Diesel internal combustion engines converted to operate with gasoline or compressed natural gas (CNG). It is well known that Diesel engines can be converted to Otto cycle engines such as (1) internal combustion engines that run on CNG or (2) internal combustion engines that run on gasoline.

It should further be noted that for the second embodiment in the case of a supercharged engine and for the third embodiment, the device, system and method of the present invention can operate with a mix fuel. Mix fuel operation refers to the injection of the first and second fuels into the chamber of the engine so that combustion occurs as a result of igniting a mixture of the first fuel, the second fuel and air in the engine chamber. That is, the fuel used to operate these embodiments comprises both the first fuel and the second fuel, i.e., a mix fuel. The mix fuel comprises a portion of the first fuel and a portion of the second fuel. The relative portions of the first and second fuels will determine the enthalpy of the exhaust gases resulting from the combustion of the mix fuel.

Referring now to FIG. 1, there is shown the device and system of the present invention. Processor 102 has a plurality of control lines 104, 180, 106, 108, 110, 112, 114 and 116 for controlling valve 140, waste gate 178, valves 136, 150, 152, throttle 130, gasoline fuel injectors 126 and Hydrogen fuel injectors 128 respectively. The processor has N inputs where N is an integer equal to 1 or greater. Processor 102 can be a microprocessor, a microcontroller, or a computer any of which can be programmed to control and operate the engine as described herein. Alternatively, a vehicle engine Electronic Control Unit (ECU) can be programmed to perform the tasks of processor 102 thus avoiding the use of a separate processor 102. The inputs are signals from various engine sensors, monitors and status indicators. For example, the inputs can comprise various engine parameters such as engine pressure, engine speed, engine temperature, boost pressure, vacuum pump operation, acceleration pedal position, throttle position, H2 sensor output, $\lambda$ sensor output, and air mass flow sensor output. Engine parameters are variables which when analyzed reflect the status of an engine and its operation. The values of one or more engine parameters can be processed, manipulated and/or modified to control the operation of the engine. Calibration of the engine to operate with Hydrogen gas (or any other fuel) involves determining, calculating and setting the various engine parameters to allow such operation. The input signals reach processor 102 via any well known manner for carrying signals to a processor. For example, the signals may be part of a wireless communication system, optical signals, electrical signals and/or electronic signals. Processor 102 indirectly controls the operation of the turbo charger through control of waste gate 178 and valves, 150 and 152. The turbo charger comprises turbine 148 coupled to shaft 146 which drives compressor 144. Valves 136 and 140 are positioned within or along air intake conduits 170 and 160 respectively to control air flow within such air intake conduits both of which are coupled to throttle 130. Valves 150 and 152 are positioned within or along exhaust pipes 162 and 158 respectively to control exhaust gas flow within such exhaust pipes both of which are coupled to catalytic converter 156 via exhaust pipe 154. The valves 150 and 152 serve to route the exhaust gases through exhaust pipe 158 to bypass waste gate 178 and the turbocharger 144, 146, 148. Waste gate 178 is positioned along or within exhaust pipe 163 to control exhaust gases flowing through this exhaust pipe which serves as a turbocharger bypass route for at least a portion of the exhaust gases routed to engage the turbocharger.

Engine 134 has intake manifold 132 on which processor controlled gasoline fuel injectors 126 and processor controlled Hydrogen gas fuel injectors 128 are mounted. The fuel injectors for the second fuel and/or the first fuel may also be positioned within chambers of the engine for an arrangement commonly referred to as direct injection. Gasoline fuel is fed to the gasoline fuel injectors 126 via fuel line 122 from fuel tank 118. Hydrogen gas fuel is fed to the Hydrogen gas fuel injectors 128 via fuel line 124 from fuel tank 120. Engine 134 further has exhaust manifold 138 from which exhaust pipe 162 extends. During operation of the engine 134 exhaust gases escape through exhaust pipe 162 and are either routed to engage turbine 148 of the turbocharger or are caused to bypass the turbocharger by routing them through exhaust pipe 158 to catalytic converter 156 and emitted to the outside environment. Operation with gasoline as the first fuel resulting in a higher output power than Hydrogen is now discussed.

When using gasoline as the first fuel, the method, device and system of the present invention control the various valves to avoid operating the turbocharger. The engine is thus operated in the no charge mode. In particular, on the intake side of the engine 134, processor 102 controls throttle 130 and gasoline fuel injectors 126 to inject the proper amount of gasoline and draw the proper amount of air into the intake manifold 132 based on the engine parameters in a well known manner. As engine 134 is naturally aspirated, processor 102 opens valve 140 thus allowing fresh air to be drawn into throttle 130 by way of air intake conduit 160 using paths 168 and 182 as shown. Processor 102 controls the position of throttle 130 to provide the proper proportions of air to mix with injected gasoline within the chambers of engine 134. On the exhaust side of the engine 134, exhaust gases emanating from pipe 162 of exhaust manifold 138 are routed through exhaust pipe 158 taking path 166 as shown. The path taken by the exhaust gases is a result of processor 102 opening valve 152 and closing valve 150 thus preventing the exhaust gases from engaging turbine 148. The exhaust gases bypass the turbocharger by flowing through exhaust pipe 158 onto exhaust pipe 154 to catalytic converter 156 after which they are emitted to the environment. Operation of the engine using gasoline may be selected through the use of a fuel selector switch (not shown) by the operator who may wish to switch operation to a second fuel such as Hydrogen. For a naturally aspirated engine in the no charge mode, air is drawn into the engine and no turbocharger or air pump is used. In the charged mode, the turbocharger is activated using the exhaust gases of the second fuel. The charged mode operations are now described for the various embodiments.

Still referring to FIG. 1, for the first embodiment, where the engine is naturally aspirated, the turbine 148, shaft 146 and compressor 144 comprise the turbocharger. In the charged mode, the turbocharger is activated by the exhaust gases which are routed to engage turbine 148 of the turbocharger and continue via path 172 to catalytic converter 156. The routing is done by the processor closing valve 152 and opening valve 150 allowing the exhaust gases to engage turbine 148 of the turbocharger. Turbine 148 then turns shaft 146 which operates compressor 144 causing said compressor to pump fresh air into the throttle 130 via paths 174 and 176. Valve 140 is also closed by processor 102. On its way to throttle 130 the air is cooled by intercooler 142. Waste gate 178 is opened or closed by the processor to control the boost pressure of the engine. That is, part of the exhaust gases is caused to bypass the turbine via exhaust pipe 163 as shown by path 164.

For the second embodiment, turbine 148, shaft 146 and compressor 144 constitute the second turbocharger. In the case where a supercharger is used, the second turbocharger shown in FIG. 1 is replaced with a supercharger (not shown), i.e., an electronically controlled air pump. For ease of illustration, the originally designed turbocharger is not shown, but is understood to be arranged in the same manner as the added second turbocharger shown in FIG. 1. The second turbocharger is activated in a similar manner as described in the first mode charged operation. That is, the second turbocharger is activated in a similar fashion as in the first embodiment using the exhaust gases of the second fuel. In the case of a supercharged engine, the originally designed supercharger is activated through control signals from processor 102. Alternatively, for a supercharged engine, a second turbocharger can be used instead of using the original supercharger to operate the engine using the second fuel. When using the second fuel, the engine is preferably operated in a lean mode using quality control.

For the third embodiment, the turbocharger shown may be a turbocharger (for example a Super VTG turbocharger) designed to operate for a defined range of exhaust gas temperatures and/or enthalpies or enthalpy ranges and thus can be activated during operation with either the first or second fuel. This turbocharger is activated using the exhaust gases of the second fuel in a manner similar to what is described and shown in FIG. 1. When using the second fuel, the engine is preferably operated in a lean mode using quality control.

It should be noted that Hydrogen, can be used as a fuel by an internal combustion engine with the proper mix of Hydrogen and air for what is referred to as "lean" operation. Depending on the particular engine, lean mode operation with Hydrogen for various ranges of values of $\lambda$ results in very little or no harmful exhaust gas emissions. The present invention is not limited to Hydrogen as the second fuel; other non-carbon based fuels may be used in place of Hydrogen. A non-carbon based fuel is matter that can be combusted in an internal combustion engine where none of the atomic or molecular components of the matter is Carbon.

An operator of the engine may be able to operate a fuel selector switch (not shown) to determine under which fuel the engine is to be operated. The fuel selector switch (not shown) may be coupled or connected to processor 102 as one of its inputs I1, . . . , IN. The fuel selector switch indicates to the processor under which fuel the engine is to be operated.

When the fuel selector switch is set to the second fuel (e.g., Hydrogen operation), the method, system and device of the present invention operate the engine 134 with processor 102 controlling the intake (i.e., air intake and fuel intake) and exhaust sides of the engine using quality control. The second fuel is mixed with air to operate the engine preferably in lean mode. Processor 102 controls Hydrogen gas fuel injectors 128 via control line 116 to inject Hydrogen gas into the engine thus controlling fuel intake of the engine. Processor 102 opens throttle 130 and maintains throttle 130 in a wide open position (throttle 130 open so as not to restrict the air flow); this is referred to as quality control. When an increase in engine output power is required, the amount of fuel being injected is increased. Further, processor 102 activates the turbocharger 148, 146, 144 by closing valve 152 and opening valve 150 allowing the exhaust gases to engage turbine 148 causing shaft 146 to rotatably engage or drive compressor 144 resulting in fresh air being pumped into air intake conduit 170. On the intake side of the engine processor 102 opens valve 136 and closes valve 140 to route the pumped fresh air to path 176 to throttle 130 thus controlling the air intake of the engine. As the fresh air flows to throttle 130 (maintained in a wide open position), it is cooled by any well known cooling device 142 positioned along air intake conduit 170. Further, processor 102 controls waste gate 178 via control line 180 to allow some of the exhaust air flow to bypass the turbo charger through exhaust pipe 163 via paths 164 and 172 to control the amount of exhaust gases that engage the turbocharger to modify (i.e., either increase or decrease) the boost pressure of the engine and thus the output power of the engine.

The device of the present invention has been described in terms of a gasoline engine vehicle retrofitted and calibrated to operate as a bi-fuel engine using Hydrogen gas as the second fuel. Other fuels such as Compressed Natural Gas (CNG) can also be used as the second fuel with the device of the present invention and ethanol can also be used as the first fuel of the device of the present invention. An originally designed engine (needs no retrofitting) built to operate with a first fuel of gasoline (or other liquid fuels such as Ethanol) and second fuels such as Hydrogen or other gaseous fuels can also be used as part of the device of the present invention. Further, the engine whether retrofitted or originally designed to operate with the claimed invention, can be a naturally aspirated engine, a turbo charged engine, or a super charged engine.

It will be readily understood that FIG. 1 may also represent a system in which an internal combustion engine is calibrated and retrofitted to operate as described with various modifications as may be considered by one skilled in the art to which this invention belongs. For example, the system of the present invention may be used to generate electricity wherein various parts of the system are not co-located, but are located at relatively large distances from each other. For example, the processor may be miles away from the engine and fuel delivery system and controls these components via a communication system. In general, when various parts of a system are said to be not co-located, this refers to arrangement of these parts so that they cannot be combined into a device that is portable or is part of a portable system such as a vehicle. Various exhaust pipes (e.g., 158, 162, and 163) and air intake conduits (e.g., 160, 170) may have relatively much longer lengths and thus may need additional pumps to enable the air flows. Further, the control lines and the input lines of the processor 102 may be part of an overall communication system which may be implemented as an optical system, a twisted pair wire electrical system or a wireless communication system.

Figure 2:
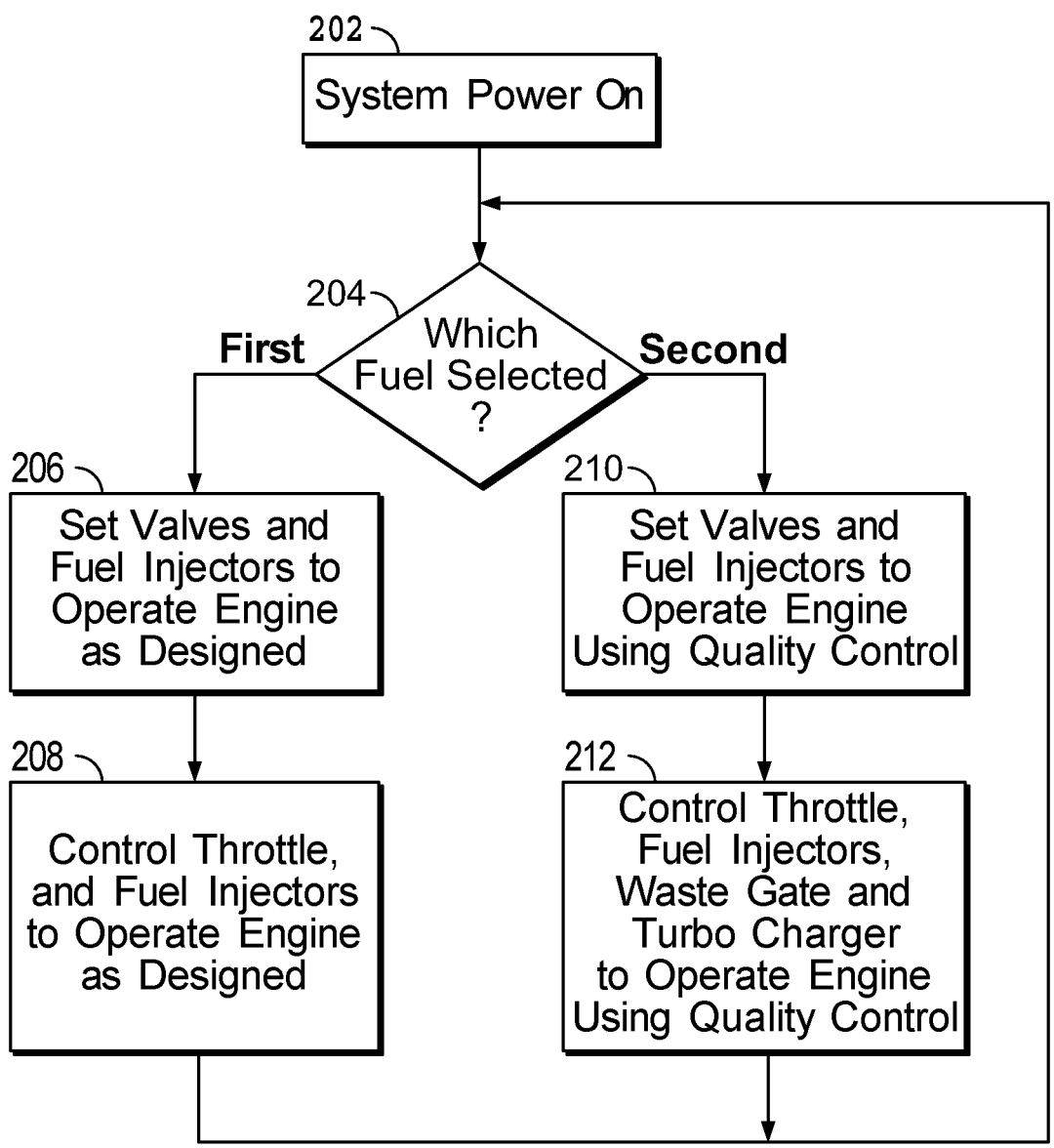
FIG. 2 shows a flow chart of the method of the present invention.

The method of the present invention is shown in FIG. 2 wherein the engine 134 operates on a first fuel of a certain power output or on a second fuel where said second fuel generates a lesser power output than the first fuel. Engine 134 can be a retrofitted and calibrated naturally aspirated engine or it can be an originally designed turbocharged or supercharged engine. In step 202, the power is turned on. The processor 102 and associated actuators (not shown) that may or may not be part of the valves, throttle, waste gate and turbo charger are activated. Processor 102 reads the state of the fuel selector switch (not shown in FIG. 1) that may be operated by an operator prior to starting the engine.

In step 204, the method of the present invention determines which fuel has been selected by the operator of the engine. In particular, processor 102 reads the status of the fuel selector switch. In step 204, if the processor has determined that the second fuel has been selected, the method of the present invention moves to step 210. Because, the second fuel generates a lesser engine output power, the method of the present invention will operate the engine in charged mode meaning an air pump (e.g., a turbocharger or supercharger) is used to pump air into the engine at a pressure higher than atmospheric pressure using quality control. For a naturally aspirated engine retrofitted with a turbocharger or supercharger, processor 102 is programmed to operate the engine in charged mode (i.e., activating the turbocharger or supercharger) when the second fuel is selected.

In step 210, for the first embodiment, processor 102 sets the valves to operate the engine in charged mode as has been described supra and preferably in a lean mode using quality control. In particular, in step 212, processor 102 re-routes the exhaust gases to operate the turbocharger (148, 146, 144) waste gate 178 and throttle 130 to control the amount of air pumped into the engine 134 as has been described supra. In the charged mode, throttle 130 can be maintained in a wide open position (i.e., using quality control). For a naturally aspirated engine retrofitted with a supercharger, processor 102 controls and operates the supercharger to pump the proper amount of air into the engine. For the second embodiment, the second turbocharger is activated and is driven or operated using the exhaust gases of the second fuel as has been described above. The originally designed turbocharger is deactivated. Also, instead of adding a second turbocharger, a processor controlled supercharger can be added to operate the engine in the charged mode, with lean operation using quality control when operating with the second fuel. In the case of a supercharged engine, the supercharger is activated; and properly operated by control signals from processor 102 for charged operation using quality control for the second fuel. Alternatively, for a supercharged engine, a turbocharger can be added to operate the engine in charged mode, lean operation using quality control as has been described above. For the third embodiment, the turbocharger with a defined temperature range (e.g., a VTG turbocharger with a relatively wide temperature range, i.e., a Super VTG) is activated using the exhaust gases of the second fuel as described with respect to FIG. 1. Such a turbocharger having a defined temperature range of operation can be designed to operate with the exhaust gases of the first or second fuels. Quality control is used to operate the engine for all three embodiments when the second fuel is selected. Further, for all three embodiments, the engine is preferably operated in a lean mode when the second fuel is selected.

Returning to step 204, if the fuel selector switch indicates to the processor 102 that the first fuel has been selected, the method of the present invention moves to step 206. In step 206 for the first embodiment, (i.e., naturally aspirated engine) the method of the present invention operates the engine 134 in the no charge mode as has been described supra. For the first embodiment, processor 102 is programmed to operate the engine in a no charge mode when the first fuel is selected. In particular, processor 102 sets the valves and controls the fuel injectors to bypass the use of the turbo charger. In the first embodiment, for a naturally aspirated engine using the first fuel, throttle 130 may be controlled as needed (variable opening of the throttle) to control operation of the engine 134 and not necessarily be kept in a fixed open position. For the second and third embodiments (turbocharged or supercharged engines), processor 102 operates the engine as designed.

In step 208, for the first embodiment, processor 102 controls the throttle and fuel injectors to operate the engine as a naturally aspirated gasoline engine with the proper control of throttle 130 and gasoline fuel injectors 126 for the first fuel. In the second embodiment, processor 102 controls the throttle and fuel injectors to operate the engine with the use of the original turbocharger or supercharger as designed. Similarly, in the third embodiment, the processor controls the throttle and fuel injectors and turbocharger having a defined temperature range of operation as designed. Such a turbocharger can be designed to operate with the exhaust gases of the first or second fuel.

The method of the present invention operates an engine using either the first fuel or the second fuel. As such the method of the present invention can alternate between modes of operation such as operating the engine using a second fuel preferably in lean mode and using quality control or operating the engine as designed using the first fuel. The method of the present invention can alternate between modes of operation as is desired by an operator of the engine.

The present invention has been described in the context of a bi-fuel engine operating on a first fuel (e.g., gasoline) or a second fuel. A conventional naturally aspirated vehicle gasoline engine can be retrofitted and calibrated to burn Hydrogen gas using a turbocharger or a supercharger or some well known type of air pump. Calibration of the engine to run on Hydrogen (or any other type of second fuel) involves determining, calculating and setting the engine parameters to certain values to enable such operation. Retrofitting an engine refers to the modification and/or adjustment of a naturally aspirated engine, a turbocharged engine or a supercharged engine with the various components of the device of the present invention to operate in accordance with the method of the present invention.

One manner in which an engine can be retrofitted is to use components from a cross platform kit comprising various components such as a housing, a processor stored in the housing, a processor controlled air pump (e.g., turbocharger, supercharger), a processor controlled throttle, an electric accelerator pedal and a processor controlled fuel intake assembly (e.g., predrilled intake manifold and fuel injectors for the primary and secondary fuels). That is, the device of the present invention is prepared or packaged as a cross platform kit. The predrilled holes of the intake manifold have the proper diameters for installation of first and second fuel injectors which are also part of the kit. For example, an engine being retrofitted to become a bi-fuel engine that operates with gasoline as the first fuel and Hydrogen as the second fuel may be fitted with a pre-drilled intake manifold where the predrilled holes of the intake manifold are openings through which the fuel injectors can be mounted. Also, the first and second fuel injectors may be installed or positioned on or proximate the engine so that they inject their respective fuels directly into the engine cylinder or chamber; this technique is called direct injection. The kit may further comprise an electric accelerator pedal that can be coupled to the processor 102 via control lines and input lines to the processor 102 to allow the processor to determine the pedal position at a particular instant in time. The term 'cross platform' refers to the ability to use the same or similar kit to retrofit different types of internal combustion engines. For variations in engine size and design, certain components of the kit may be modified, but the basic set of components of a cross platform kit remains virtually the same from engine to engine. For example, the intake manifold may be smaller or bigger or a different shape for different engines, but the basic component of an intake manifold is constant for all kits. Alternate versions of the cross platform kit may not have a processor; instead, software having instructions to operate the engine as per the method of the present invention can be downloaded onto the ECU of the engine being retrofitted. The downloaded software can complement the existing software in the ECU to properly operate the engine. The cross platform kit is thus a grouping of components which when properly installed on a conventional (naturally aspirated, turbocharged or supercharged) engine to retrofit the engine allows the engine to operate as a bi-fuel engine where at least one of the fuels can be a non-carbon based fuel (e.g., Hydrogen).

It will be readily understood, however, that engines originally designed specifically to operate in accordance with the method, device and system of the present invention can also be used and thus the present invention is not limited to retrofitted engines. That is, the present invention can be implemented with an engine originally designed and manufactured to operate in accordance with the method, device and system of the present invention. It will also be readily understood that the method, device and system of the present invention are not limited to the particular retrofitted conventional gasoline engine shown in FIG. 2; the particular engine in FIG. 2 is used for ease of explanation. When operating an internal combustion engine with Hydrogen, (i.e., Hydrogen gas, H2) the device, method and system of the present invention allow for more power at lower engine speed (i.e., more low end torque) and reduced nitrogen oxides emissions at lower engine speeds. The terms Hydrogen and Hydrogen gas will hereinafter be used interchangeably to indicate the various states of Hydrogen which can be used in this claimed invention.

The device, system and method of the present invention have been described in terms of various embodiments as described herein. It will be readily understood that the embodiments disclosed herein do not at all limit the scope of the present invention. One of ordinary skill in the art to which this invention belongs can, after having read the disclosure may implement the device, system and method of the present invention using other implementations that are different from those disclosed herein but which are well within the scope of the claimed invention.

What is claimed is:

1. A device for operating an engine, the device comprising:
a processor wherein said processor activates at least one air pump coupled to the engine to operate the engine in a charged mode using a first fuel, and
wherein the processor deactivates the at least one air pump to operate the engine in a charged and lean mode using a second fuel.

2. The device of claim 1, wherein the at least one air pump is one of a turbocharger and a supercharger.

3. The device of claim 2, wherein the turbocharger is a Variable Turbine Geometry (VTG) turbocharger.

4. The device of claim 2, wherein the supercharger is electrically or electronically controlled by the processor.

5. The device of claim 1, wherein the processor is one of a microprocessor, a microcontroller, a computer, and an engine Electronic Control Unit.

6. The device of claim 1, wherein the engine is an Otto cycle engine.

7. The device of claim 1, wherein during the charged and lean mode operation, the processor controls engine air intake using quality control.

8. The device of claim 1, wherein the engine is a bi-fuel engine.

9. The device of claim 1, wherein the engine is a naturally aspirated engine.

10. The device of claim 1, wherein the first fuel is a carbon based fuel.

11. The device of claim 10, wherein the carbon based fuel is one of gasoline, Compressed Natural Gas (CNG), Ethanol, and Diesel fuel.

12. The device of claim 1, wherein the second fuel is a non-carbon based fuel.

13. The device of claim 12 wherein the non-carbon based fuel is Hydrogen.

14. The device of claim 1, wherein the processor controls a fuel intake assembly having at least one fuel injector for the first fuel and at least one fuel injector for the second fuel wherein said fuel intake assembly is mounted onto the engine.

15. The device of claim 14, wherein the first fuel is fed to the at least one first fuel injector via a first fuel line from a first fuel tank, and the second fuel is fed to the at least one second fuel injector via a second fuel line from a second fuel tank.

16. The device of claim 14, wherein the at least one fuel injector for the first fuel is a carbon based fuel injector and the at least one fuel injector for the second fuel is a non-carbon based fuel injector.

17. The device of claim 16, wherein the carbon based fuel injector is a gasoline fuel injector and the non-carbon based fuel injector is a hydrogen fuel injector.

18. The device of claim 1, wherein the processor has N inputs for receiving input signals where N is an integer equal to 1 or greater.

19. The device of claim 18, wherein the processor is configured to receive the input signals from sensors, monitors or status indicators of the engine.

20. The device of claim 19, wherein the input signals are engine parameters comprising at least one of engine pressure, engine speed, engine temperature, boost pressure, vacuum pump operation, acceleration pedal position, throttle position, Hydrogen sensor output, $\lambda$ sensor output, and air mass flow sensor output.

21. The device of claim 19, wherein the input signals are one of optical signals, electrical signals, electronic signals, and wireless signals.

22. The device of claim 21, wherein the wireless signals are signals from at least one wireless communication system.

* * * * *